(12) United States Patent
Fattic et al.

(10) Patent No.: US 6,565,479 B2
(45) Date of Patent: May 20, 2003

(54) APPARATUS AND METHOD FOR SMOOTHING OF VEHICLE DRIVELINES

(75) Inventors: Gerald Thomas Fattic, Fishers, IN (US); James E. Walters, Carmel, IN (US); Michael Scott Sullivan, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/899,725

(22) Filed: Jul. 5, 2001

(65) Prior Publication Data

US 2003/0017910 A1 Jan. 23, 2003

(51) Int. Cl.$^7$ ................................. B60K 1/02
(52) U.S. Cl. ........................................ 477/3
(58) Field of Search .................... 477/2, 3, 111

(56) References Cited

U.S. PATENT DOCUMENTS

| | | | | |
|---|---|---|---|---|
| 3,671,832 A | * | 6/1972 | Salihi | 318/231 |
| 4,630,583 A | * | 12/1986 | Suzuki et al. | 123/425 |
| 4,852,008 A | | 7/1989 | Sager | 364/426 |
| 4,963,804 A | * | 10/1990 | Geiger | 318/460 |
| 5,035,142 A | * | 7/1991 | Dryga et al. | 73/579 |
| 5,573,474 A | * | 11/1996 | Marsh et al. | 477/111 X |
| 5,610,490 A | | 3/1997 | King et al. | 318/611 |
| 5,730,094 A | | 3/1998 | Morris | 123/192 |
| 6,102,144 A | * | 8/2000 | Lutz | 180/65.2 |
| 6,138,629 A | * | 10/2000 | Masberg et al. | 123/192.1 |
| 6,163,121 A | * | 12/2000 | Kumar et al. | 318/434 |
| 6,176,808 B1 | * | 1/2001 | Brown et al. | 477/3 X |
| 6,209,692 B1 | * | 4/2001 | Pels et al. | 188/381 |
| 6,247,437 B1 | * | 6/2001 | Yamaguchi et al. | 180/65.2 X |
| 6,319,168 B1 | | 11/2001 | Morris et al. | 477/5 |
| 6,405,701 B1 | * | 6/2002 | Masberg et al. | 123/192.1 |
| 6,441,506 B2 | * | 8/2002 | Nakashima | 180/65.2 X |

\* cited by examiner

*Primary Examiner*—Sherry Estremsky
*Assistant Examiner*—Roger Pang
(74) *Attorney, Agent, or Firm*—Margaret A. Dobrowitsky

(57) ABSTRACT

A method for and apparatus for preventing oscillations of a vehicle. The engine speed is monitored and filtered, the filtered engine speed being compared to a natural frequency of the vehicle. The natural frequency corresponds to a gear ratio of the vehicle. A torque command is provided to an electric machine coupled to a driveline of the vehicle, the electric machine provides a counteracting torque to the driveline in order to eliminate oscillations in the vehicle.

12 Claims, 5 Drawing Sheets

Motor RPM Profile 64 during 0 to -25 Nm step

Regen Torque Step Profile during 0 to -25 Nm step ation is based upon the natural frequency of the system.

APPARATUS AND METHOD FOR SMOOTHING OF VEHICLE DRIVELINES

TECHNICAL FIELD

The present invention relates to motor vehicle drivelines, and in particular, to a method and apparatus for smoothing out oscillations in the vehicle driveline.

BACKGROUND

Surge in a motor vehicle is caused when the natural frequency of the vehicle's driveline is activated by a torque transient. The torque transient can be caused by a rapid change in torque from the engine or induced from road disturbances. These torque disturbances cause the vehicle's driveline to resonate at the natural frequency of the system. The mechanical system is an inertia, spring, inertia configuration with a well documented natural frequency characteristic. The spring component of the system is the contribution of the spring constants of the driveshaft and axles. One inertia in the system is the mass of the vehicle reflected through the tires at one end of the drive system. The other inertia is the engine and transmission components attached to the other end of the system.

The oscillation of the driveline system at the natural frequency will cause an acceleration cycle to be felt in the vehicle. The vehicle will be accelerated on one-half of the cycle and slowed down on the other half of the cycle. This is due to driveline oscillations. Depending on the type of components used in making the vehicle, the frequency range of the natural driveline frequencies range from 1 Hz to 12 Hz.

Accordingly, it is desirable to smooth out the oscillations in the driveline of the vehicle.

SUMMARY OF THE INVENTION

A method and apparatus for preventing and/or minimizing driveline surge. A control system monitors engine speed in order to detect perturbations that are higher than the natural frequency of the system. The engine speed is filtered by a high pass filter in order to remove the DC and low frequency components of the engine speed. A counteracting torque is applied to the system to cancel out the torque perturbations that are at or higher that the natural frequency of the system.

The above-described and other features and advantages of the present invention will be appreciated and understood by those skilled in the art from the following detailed description, drawings, and appended claims.

DESCRIPTION OF THE PREFERRED EMBODIMENT

Figure 1:
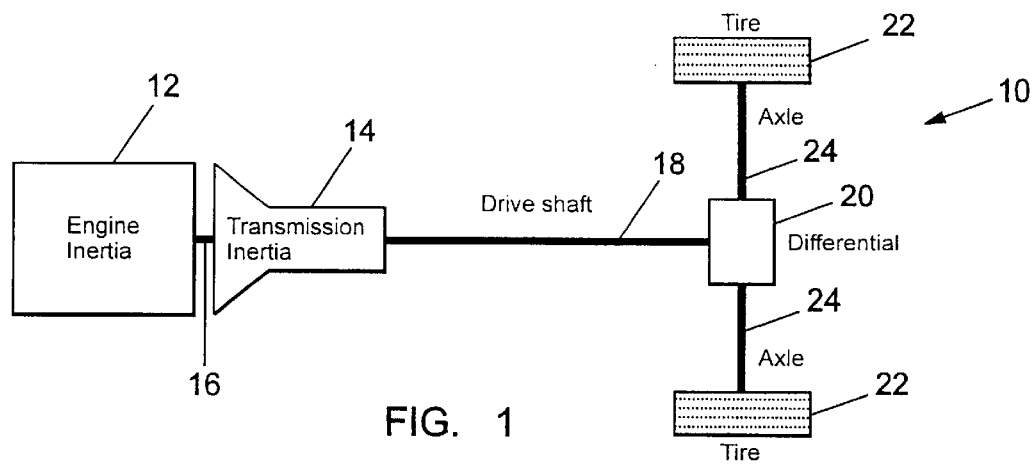
FIG. 1 is a schematic illustration of a vehicle driveline.

Referring now to FIG. 1, a typical vehicle driveline 10 is illustrated. Vehicle driveline 10 includes an engine 12 that is mechanically coupled to a transmission 14. Engine 12 is coupled to transmission 14 through a crankshaft 16. Engine 12 provides engine inertia to transmission 14 through crankshaft 16. Transmission 14 is an inertia connected to a drive shaft 18 that is coupled to transmission 14 at one end and a differential 20 at the other. Differential 18 is mechanically coupled to a pair of tires 22 through a pair of axles 24. Accordingly, engine 12 provides a driving force to the wheels.

Figure 2:
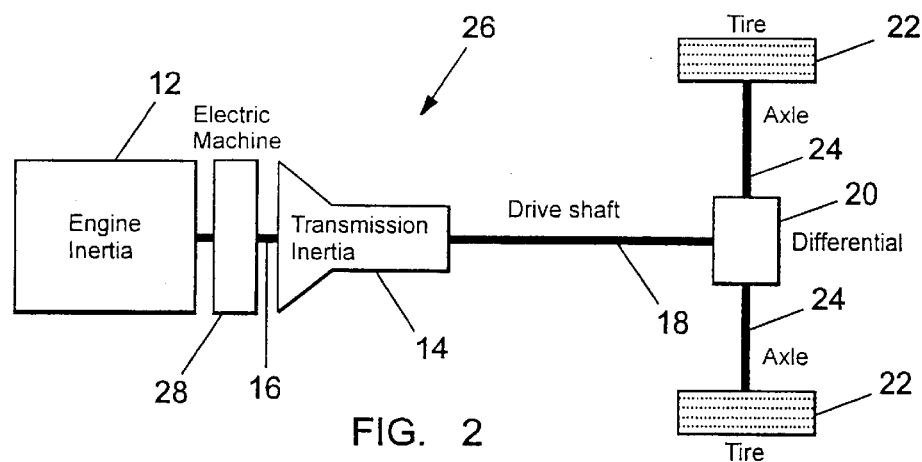
FIG. 2 is a schematic illustration of a vehicle driveline constructed in accordance with an exemplary embodiment of the present invention.

Referring now to FIG. 2, a vehicle driveline 26, constructed in accordance with an exemplary embodiment of the present invention, is illustrated. Here, an electric machine 28 is attached to the crankshaft and is used to reduce the amount of oscillation in the driveline. In an exemplary embodiment, the rotor of the electric machine is fixedly secured to the driveline of the vehicle, for example, the crankshaft of the engine.

Electric machine 28 is used to create a torque that is out of phase with the natural frequency oscillation of the driveline. This will reduce the amplitude and duration of the oscillation.

It is contemplated that electric machine 28 and the method and apparatus for the smoothing of a vehicle driveline can be applied to a type of vehicle, including but not limited to the following: vehicles having internal combustion engines, electric vehicles, and hybrid vehicles.

The method used to determine the required electric machine torque to suppress the driveline oscillation is based upon engine speed and gear of the transmission. The transmission gear affects the natural frequency of the driveline. As the gear ratio changes, the reflected inertia to the drive shaft changes. This causes changes to the natural frequency of the system. Therefore, knowing what the natural frequency of the system is for all the gear ratios will direct what filter frequencies to use for creating a torque signal for the electric machine. These values can be determined either empirically, or through the use of mathematical modeling. The values are then stored in the memory of the system, in an EEPROM, for example.

In addition, and in accordance with an exemplary embodiment, it is contemplated that the present invention may be employed with either a manual or automatic transmission.

Figure 3:
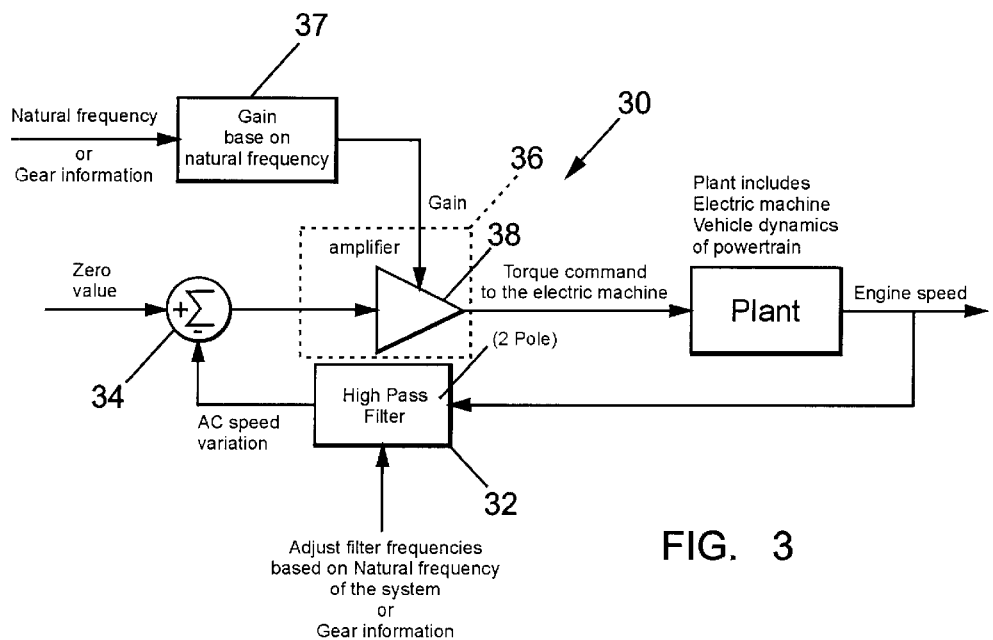
FIG. 3 is a diagrammatic illustration of the control system of an exemplary embodiment of the present invention.

Referring now to FIG. 3, a control system 30 is illustrated. Control system 30 provides commands to electric machine 28 in order to create a torque that is out of phase with the natural frequency oscillation.

It should be noted, that adding a differential control to determine acceleration can add more phase to the control signals and cause the control system to be unstable. The control system could oscillate on its own, causing the motor control torque to oscillate, which would cause unwanted movement in the vehicle.

The natural frequency is used to determine the frequencies of the filter in the control system. The engine speed information is processed through a high pass filter 32 in order to remove any constant velocity or low frequency acceleration of the vehicle. In an exemplary embodiment, the high pass filter is located in an engine control module (ECM) of the vehicle.

The frequency of the high pass filter is selected by the natural or resonant frequency of the corresponding vehicle driveline.

The output from the high pass filter (32) is sent to a summing block 34. The summing block's reference signal is set to zero. The resulting signal will be the error of the AC signal of the engine speed. Engine speed is the same as electric machine speed. The objective is to reduce all the AC speed values above the high pass filter frequency to zero. The error signal from the summing block (34) is sent to a proportional gain block 36. Proportional gain block 36 is also based on the natural frequency input from block 37. Block 37 provides a natural frequency input corresponding to the current gear ratio of the driveline of the vehicle. Accordingly, block 37 will receive a signal indicative of the gear status. The output of a proportional gain amplifier 38 is the torque command that controls the electric machine torque.

To minimize the effect of any vehicle acceleration, and to have the proper phase relationship for the torque command signal, the corner frequency of the high pass filter is set to provide 45 or less degrees of a phase lead at the natural frequency of the system. This ensures that as the frequency moves slightly from the natural frequency, the phase margin will ensure gain dampening of the system. The resulting torque will be phased to cancel the torque pulsation.

Figure 4:
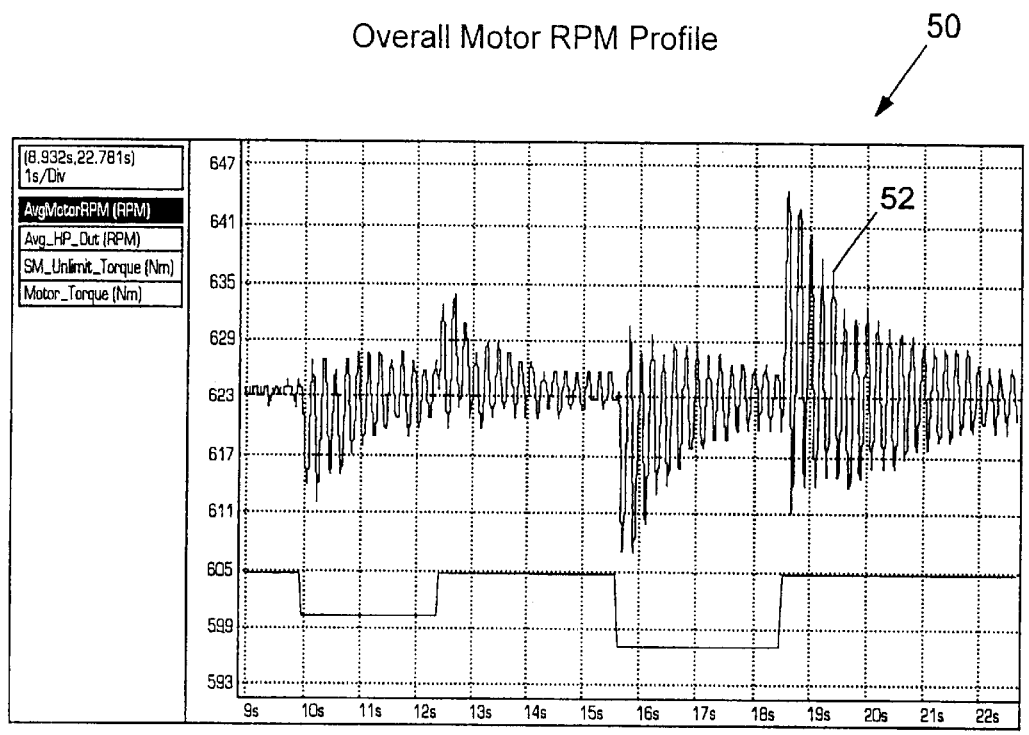
FIG. 4 is a graph illustrating motor RPM and motor torque during a driveline oscillation mode.

Referring now to FIGS. 4–7, operational aspects of the present invention are illustrated with reference to sample data for a particular setting. FIG. 4 illustrates an overall motor RPM profile 50 from sample data taken with the following parameters.

This is sample data taken from dyne testing. The dyne fixture was set up with a five hertz resonant coupling. Surge Smoothing Disabled—5 Hz Dyne coupling—motor rpm, motor torque 625 RPM, Open Loop (Surge Smoothing Disabled) Regen Torque Step Profile. 5 Hz Dyne Coupling, Gain=1, Gear=3. Line 52 displays the motor rpm. The average speed is about 623 rpm. The speed is oscillating around the average rpm value.

Figure 5:
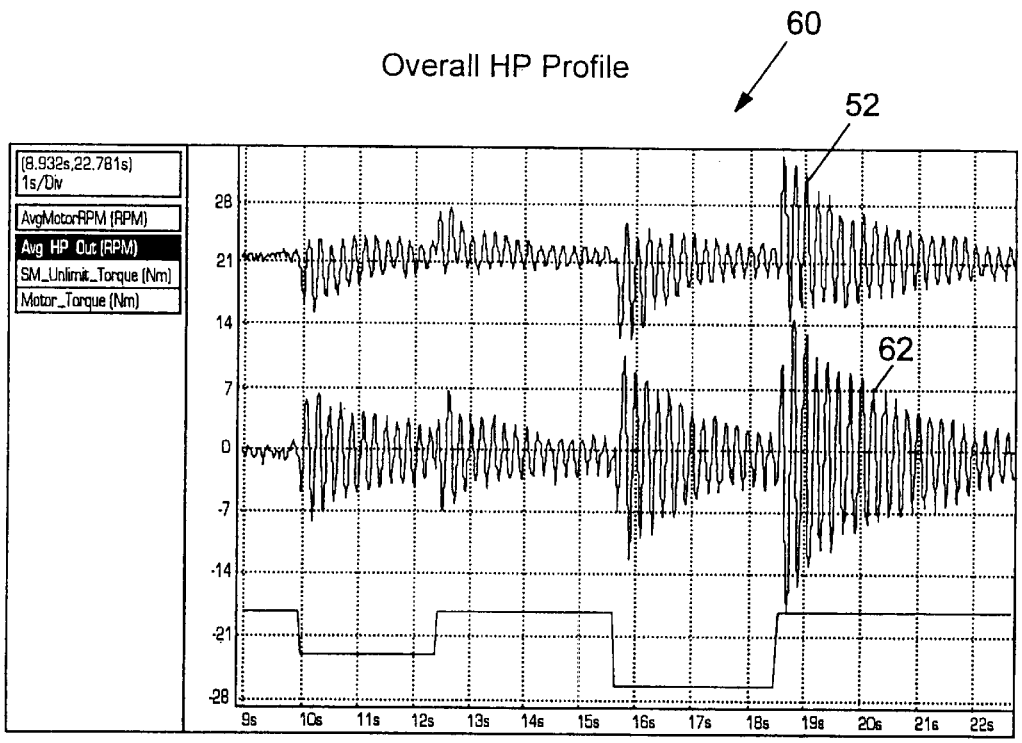
FIG. 5 is a graph illustrating the output of the high pass filter and the motor RPM.

Referring now to FIG. 5, an overall profile of the high pass filter of speed 60 is illustrated. This sample data was also taken from dyne testing. The dyne fixture was set up with Surge Smoothing Disabled—5 Hz Dyne coupling—High pass, Motor rpm, 625 RPM, Open Loop (Surge Smoothing Disabled) Regen Torque Step profile, 5 Hz Dyne Coupling, Gain=1, Gear=3.

Line 62 displays the output of the high pass filter. The average value of the filter is zero rpm, and the magnitude swings negative and positive. The constant velocity and low frequency acceleration have been removed.

Figure 6:
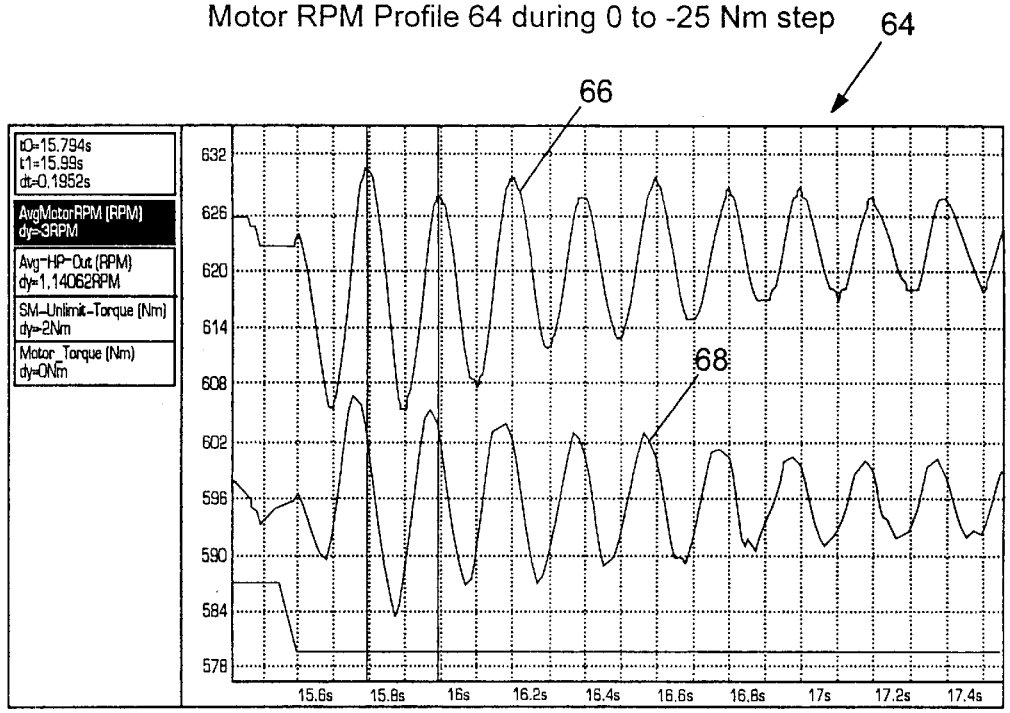
FIG. 6 is a graph also illustrating the output of the high pass filter and the motor RPM.

Referring now to FIG. 6, a Motor RPM Profile 64 during a 0 to −25 Nm torque step is illustrated. This sample data was also taken from dyne testing with the following parameters 625 RPM, Open Loop (Surge Smoothing Disabled) Regen Torque Step Profile 5 Hz Dyne Coupling, Gain=1, Gear=3.

This is an enlarged trace on the time scale. This displays the phase difference between the motor rpm 66 and the output of the high pass filter 68.

Notice that the peaks of the two traces 66 and 68 are offset in the time scale. The peak on the high pass filter trace occurs before the motor rpm peak. The high pass filter is performing two tasks. It removes the average rpm reading and advances the output of the high pass filter. This will provide the appropriate phasing for the torque command to the electric machine to ensure stable operation.

Figure 7:
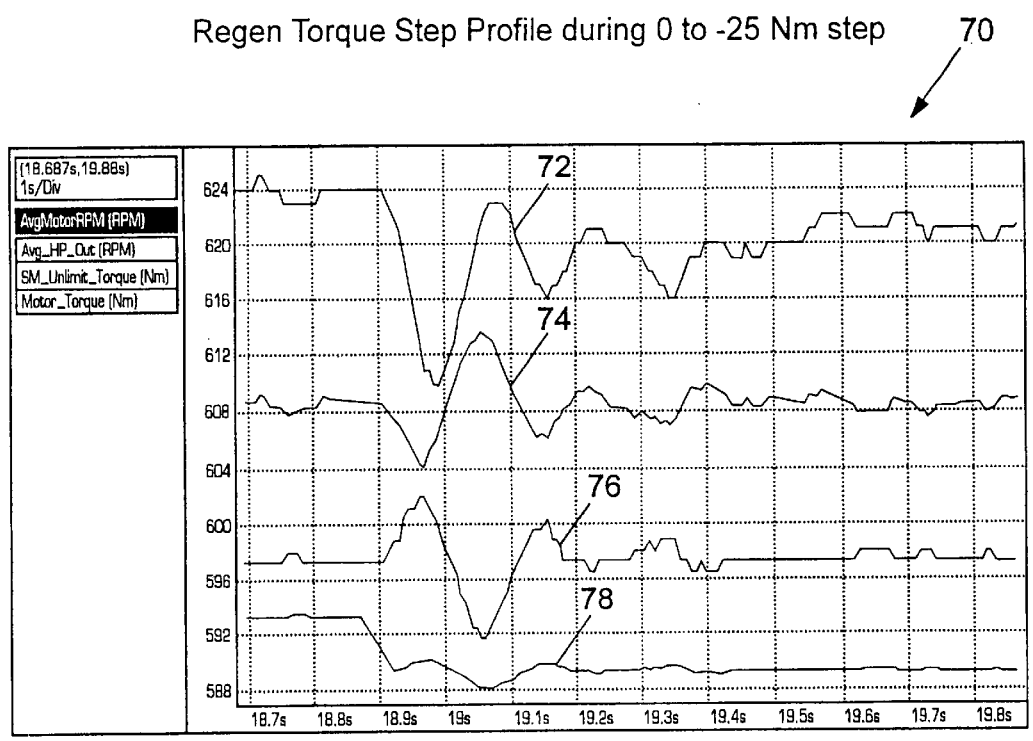
FIG. 7 is a graph illustrating the oscillation amplitude and period of time in the oscillation mode.

When surge smoothing is enabled, the oscillation amplitude and the period of time in the oscillation mode is reduced greatly (See FIG. 7). A Regen Torque Step Profile 70 during 0 to −25 Nm step is illustrated. This sample data was also taken from dyne testing with the following parameters 625 RPM, Closed Loop (Surge Smoothing Enabled) 5 Hz Dyne Coupling, Gain=1, Gear=3. Here, AveMotorRPM (RPM) is indicated by trace 72, (Average High Pass speed filter) Avg_HP_Out (RPM) is indicated by trace 74, (Surge Smoothing Torque) SM_Unlimit_Torque (Nm) is indicated by trace 76 and Motor_Torque (Nm) is indicated by trace 78.

FIGS. 4–7 illustrate only a single application of the present invention, but of course, numerous scenarios are possible.

Figure 8:
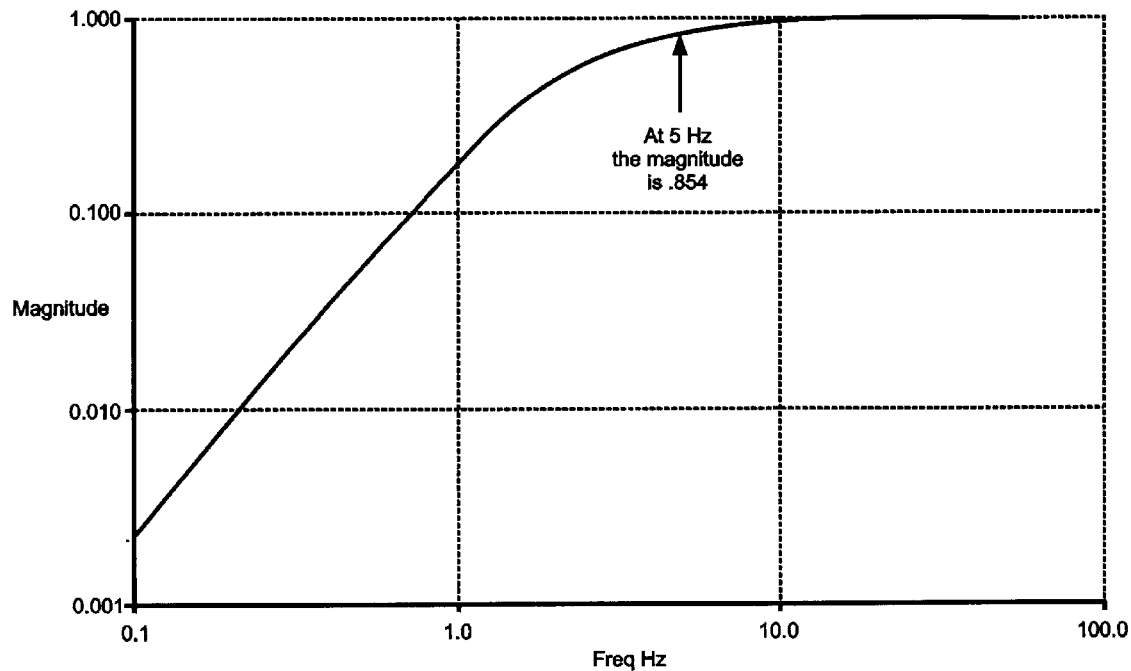
FIG. 8 is a graph illustrating the magnitude versus frequency characteristics of a two-pole high pass filter.

FIG. 8 illustrates the input to output magnitude characteristics of a two pole high pass filter. At low frequencies, the magnitude will be very small, and as the frequency increases, the magnitude will increase to a value of one.

Figure 9:
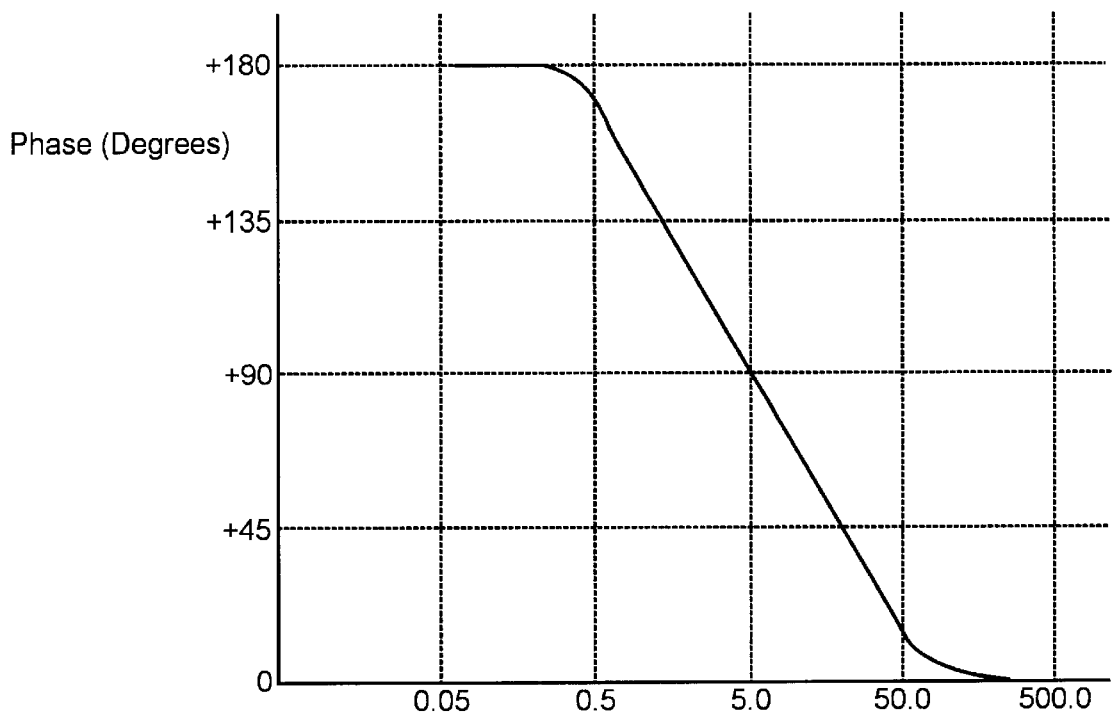
FIG. 9 is a graph illustrating the phase versus frequency characteristics of a two-pole high pass filter.

FIG. 9 illustrates the input to output phase characteristic of a two pole high pass filter. At low frequencies, the phase approaches 180 degrees. At the corner frequency of the filter, the phase is 90 degrees. At the higher frequencies, the phase approaches 0 degrees.

Figure 10:
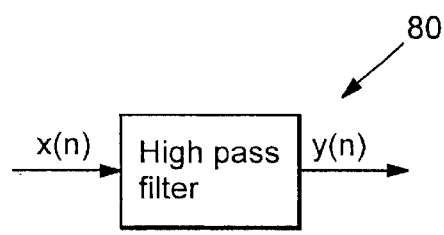
FIG. 10 is a schematic diagram of a two-pole high pass filter.

Referring now to FIG. 10, a high pass filter 78 can be implemented in a digital controller 80 by computing equations in a microprocessor.

The filter equations for the second-order filter is described as follows:

The high pass filter representation for a second order filter.

$$y(n) = C_1 * x(n) + C_2 * x(n-1) + C_3 * x(n-2) - D_1 * y(n-1) - D_2 * y(n-2)$$

where the coefficients $C_1$, $C_2$, $C_3$, $D_1$, $D_2$ are determined by the desired filter frequency and the program loop time.

x(n) is the input value to the filter for the present program loop.

x(n−1) is the input value to the filter from the previous program loop.

x(n−2) is the input value to the filter from the second previous program loop.

y(n) is the output value of the filter for the present program loop.

y(n−1) is the output value of the filter from the previous program loop.

y(n−2) is the output value of the filter from the second previous program loop.

For this application, the gain values can be obtained from a look-up table stored in the memory of the system.

| The gain numbers have the units of Nm/rpm | | | | | | | | | |
|---|---|---|---|---|---|---|---|---|---|
| 1.0 | 1.0 | 1.0 | 1.2 | 1.4 | 1.6 | 1.8 | 2.0 | 2.0 | 2.0 |
| 1 Hz | 2 Hz | 3 Hz | 4 Hz | 5 Hz | 6 Hz | 7 Hz | 8 Hz | 9 Hz | 10 Hz |

These gain values are for illustrative purposes of a particular application and can vary depending on the type of vehicle in which the system is used.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control system for a vehicle having an engine, a driveline having gear ratios, and an electric machine adapted to be coupled to the driveline, comprising:

a filter for filtering the speed of the engine of the vehicle;

a database containing natural frequencies of the gear ratios of the driveline of the vehicle; and a controller for providing commands to the electric machine when said filter provides an output greater than a natural frequency in said database, said natural frequency corresponding to the gear ratio at which the driveline is currently operating.

2. The control system as in claim 1, wherein said filter is a high pass filter.

3. The control system as in claim 2, wherein said filter provides an AC component of the engine speed of the engine of the vehicle, said AC component being input into a summing block.

4. The control system as in claim 3, wherein said summing block is zeroed.

5. The control system as in claim 4, further comprising:

a proportional gain block for receiving an input from said summing block and a storage medium containing natural frequencies corresponding to the gear ratio of the vehicle, said proportional gain block containing an amplifier for amplifying said inputs and providing a torque command output to the electric machine, said torque command output being determined to negate torque oscillations in the vehicle.

6. The control system as in claim 5, wherein the electric machine comprises:

a rotor being fixedly secured to a crankshaft of the engine of the vehicle.

7. The control system as in claim 2, wherein said high pass filter is set to provide a phase lead in the range from 45 or less degrees at the natural frequency of the system.

8. The control system as in claim 2, wherein said high pass filter is set to provide 45 degrees or less of a phase lead at the natural frequency of the system.

9. The control system as in claim 2, wherein said high pass filter is set to provide 45 degrees of a phase lead at the natural frequency of the system.

10. A control system for a vehicle having a engine, a driveline, and an electric machine adapted to be coupled to the driveline, comprising:

a filter for receiving and filtering the speed of the engine of the vehicle;

a storage medium containing natural frequencies of gear ratios of the driveline of the vehicle;

a controller for providing commands to the electric machine when said filter provides an output greater than a natural frequency in said storage medium, said natural frequency corresponding to the gear ratio at which the driveline is currently operating, the electric machine, in response to the commands from said controller, providing a torque force to the driveline in order to prevent torque perturbations in the vehicle.

11. The control system as in claim 10, wherein the electric machine comprises:

a rotor being fixedly secured to a crankshaft of the engine of the vehicle.

12. The control system as in claim 1, wherein the electric machine comprises:

a rotor being fixedly secured to a crankshaft of the engine of the vehicle.

* * * * *